United States Patent
Huang et al.

(10) Patent No.: US 12,287,268 B2
(45) Date of Patent: Apr. 29, 2025

(54) FPGA-BASED MULTI-CHANNEL DYNAMIC LIGHT SCATTERING AUTOCORRELATION SYSTEM AND METHOD

(71) Applicant: National Institute of Metrology, China, Beijing (CN)

(72) Inventors: Lu Huang, Beijing (CN); Yuqi Fang, Beijing (CN); Sitian Gao, Beijing (CN); Miao Sun, Beijing (CN)

(73) Assignee: National Institute of Metrology, China, Beijing (CN)

( * ) Notice: Subject to any disclaimer, the term of this patent is extended or adjusted under 35 U.S.C. 154(b) by 591 days.

(21) Appl. No.: 17/648,379

(22) Filed: Jan. 19, 2022

(65) Prior Publication Data

US 2023/0010324 A1 Jan. 12, 2023

(30) Foreign Application Priority Data

Jul. 7, 2021 (CN) .......................... 202110767211.8

(51) Int. Cl.
*G01N 15/0205* (2024.01)
(52) U.S. Cl.
CPC . *G01N 15/0211* (2013.01); *G01N 2015/0222* (2013.01)
(58) Field of Classification Search
CPC ................. G01N 15/0211; G01N 2015/0222
See application file for complete search history.

(56) References Cited

U.S. PATENT DOCUMENTS

2013/0215423 A1* 8/2013 Tochino ............. G01N 15/0211
356/336

FOREIGN PATENT DOCUMENTS

| CN | 102033032 A | * | 4/2011 | |
| EP | 2365313 A1 | * | 9/2011 | ......... G01N 15/0211 |
| JP | 4346476 B2 | * | 10/2009 | |

* cited by examiner

*Primary Examiner* — Patrick O Neill
(74) *Attorney, Agent, or Firm* — DLA PIPER LLP (US)

(57) ABSTRACT

The present disclosure relates to a field programmable gate array (FPGA)-based multi-channel dynamic light scattering (DLS) autocorrelation system and method. The system includes a DLS generation apparatus, a photon correlator, and a host computer, where the photon correlator includes an FPGA and a universal serial bus (USB) communication module; the DLS generation apparatus is connected to the FPGA; the FPGA is configured to count and perform correlation calculation on photon pulses generated by the DLS generation apparatus; the USB communication module is connected to the host computer; the FPGA includes a dual counter module and a correlation calculation module; the dual counter module is connected to the DLS generation apparatus and the correlation calculation module; the correlation calculation module is connected to the USB communication module; the dual counter module includes a plurality of dual counters; and the correlation calculation module includes a plurality of correlators.

16 Claims, 4 Drawing Sheets

FPGA-BASED MULTI-CHANNEL DYNAMIC LIGHT SCATTERING AUTOCORRELATION SYSTEM AND METHOD

CROSS REFERENCE TO RELATED APPLICATION(S)

This application claims priority to Chinese Patent Application No. 202110767211.8, filed Jul. 7, 2021, which is herein incorporated by reference in its entirety.

TECHNICAL FIELD

The present disclosure relates to the technical field of dynamic light scattering (DLS) particle measurement, and, in particular, to a field programmable gate array (FPGA)-based multi-channel DLS autocorrelation system and method.

BACKGROUND ART

A DLS technology is an effective method for sub-micron and nanoparticle granularity measurement. In the DLS particle measurement technology, photon correlation spectroscopy (PCS) is widely used. In suspension of nano and submicron particles, the particles continuously perform Brownian motion due to collision of surrounding medium molecules. The Brownian motion makes a frequency of scattered light of the particles produce a Doppler shift relative to incident light. Specifically, a scattered light intensity signal fluctuates continuously with time at a scattering angle, and an instantaneously changed scattered light signal includes information about a measured particle size. A particle size measurement method is used to obtain measured particle sizes and distribution information thereof by studying time correlation of a scattered light signal.

In an existing implementation solution, the FPGA and digital signal processing (DSP) are used to implement a proportional photon correlator, and main functional modules include a photon counting module, a correlation calculation module, and a universal serial bus (USB) communication module. A specific implementation method is to transmit a photon pulse signal generated by a DLS generation apparatus to the FPGA and count collected photon pulses by using a dual photon counter designed in the FPGA. A sampling clock in the FPGA triggers interruption of the DSP, a photon count value is received in an external interrupt function, and a correlation function is calculated. Finally, communication with a computer is performed through a USB interface, and a total quantity of the collected photon pulses, a total quantity of sampling times, and a correlation function value are sent to a personal computer (PC). The PC performs normalization processing to obtain a light intensity autocorrelation function. FIG. 1 shows the proportional photon correlator based on the FPGA and the DSP.

A problem in the prior art is that a commercial instrument for measuring a particle size by using a DLS method is not highly integrated, which is reflected in the following two aspects.

1. To process optical signals generated after a sample undergoes DLS, the optical signals are mostly counted by using a commercial counter first, and then autocorrelation calculation is performed by using a commercial correlator. The commercial correlator is implemented by using the FPGA and the DSP.

2. A system that is for measuring the particle size through DLS and that is set up by the counter and the correlator mentioned in the first point can only collect and calculate one path of signal at a time. That is, one set of system can only measure at one scattering angle at the same time. If there is a need to perform multi-angle DLS measurement on a sample particle, a plurality of sets of devices need to be configured or measurement at a plurality of different angles is needed. This not only increases time and money costs of measurement, but also may cause an additional error due to an uncontrollable environmental factor change at different time.

SUMMARY

An objective of the present disclosure is to provide an FPGA-based multi-channel DLS autocorrelation system and method, to simultaneously collect and calculate sample particle sizes and distribution thereof at a plurality of angles.

To implement the foregoing objective, embodiments of the present disclosure provides the following solutions.

An FPGA-based multi-channel DLS autocorrelation system includes a DLS generation apparatus, a photon correlator, and a host computer, where:

the photon correlator includes an FPGA and a USB communication module; the DLS generation apparatus is connected to the FPGA; the FPGA is configured to count and perform correlation calculation on photon pulses generated by the DLS generation apparatus; the USB communication module is connected to the host computer; the USB communication module is configured to transmit a counting result and a correlation calculation result to the host computer; the host computer is configured to determine particle information based on the counting result and the correlation calculation result; and the particle information includes a particle size and particle dispersibility; and the FPGA includes a dual counter module and a correlation calculation module; the dual counter module is connected to the DLS generation apparatus and the correlation calculation module; the correlation calculation module is connected to the USB communication module; the dual counter module includes a plurality of dual counters; and the correlation calculation module includes a plurality of correlators.

Optionally, the FPGA may further include a dynamic storage area, and the dynamic storage area may be configured to store the counting result.

Optionally, the FPGA may further include a clock control module, and the clock control module may be connected to the DLS generation apparatus, the dual counter module, the correlation calculation module, and the USB communication module.

Optionally, the correlator may be a proportional correlator.

An FPGA-based multi-channel DLS autocorrelation method is provided, where the FPGA-based multi-channel DLS autocorrelation method is applied to the foregoing FPGA-based multi-channel DLS autocorrelation system, and the FPGA-based multi-channel DLS autocorrelation method includes:

obtaining multi-path photon pulses emitted by the DLS generation apparatus;

determining an autocorrelation function of a scattered light intensity signal with respect to sampling time based on the photon pulses;

determining a normalized electric field autocorrelation function based on the autocorrelation function of the scattered light intensity signal with respect to the sampling time; and when particles are of a single particle size, determining the particle size based on the electric field autocorrelation function; or when particles are not of a single particle size, determining a particle size distribution function based on the electric field autocorrelation function; and determining particle dispersibility based on the particle size distribution function.

Optionally, when the particles are of the single particle size, a calculation formula of the particle size may be:

$$R_h = \frac{K_B T [4\pi \sin(\frac{\theta}{2})]^2]}{3\pi \Gamma \eta \lambda^2}$$

where $R_h$ is the particle size to be calculated, $K_B$ is a Boltzmann constant, T is an absolute temperature, $\theta$ is a scattering angle, $\Gamma$ is a decay line width, $\eta$ is viscosity of a dispersion medium, and $\lambda$ is a wavelength of incident light in vacuum.

Optionally, the determining particle dispersibility based on the particle size distribution function may specifically include:

determining normalized variance of the particle size distribution function based on the particle size distribution function; and determining the particle dispersibility based on the normalized variance.

Optionally, a calculation formula of the normalized variance may be:

$$\frac{\int (\Gamma - \overline{\Gamma})^2 G(\Gamma) d\Gamma}{\overline{\Gamma}^2} = \sigma^2$$

where $\Gamma$ is a decay line width, $\overline{\Gamma}$ is an average decay line width of the particles, $G(\Gamma)$ is the particle size distribution function, and $\sigma^2$ is the normalized variance.

Based on specific embodiments provided in the present disclosure, the present disclosure discloses the following technical effects.

In the FPGA-based multi-channel DLS autocorrelation system and method provided in the present disclosure, the FPGA is set, so that functions of collection and calculation are both implemented in the FPGA. That is, functions of counting and autocorrelation calculation are both integrated in the FPGA. A parallel processing capability of the FPGA can process simultaneous collection and calculation at a plurality of angles. This not only reduces test time but also reduces the impact of an environmental factor on a measurement result.

BRIEF DESCRIPTION OF THE DRAWINGS

To describe the technical solutions in the embodiments of the present disclosure or in the prior art more clearly, the accompanying drawings used in the embodiments are briefly described below. The accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions in the embodiments of the present disclosure are clearly and completely described below with reference to the accompanying drawings in the embodiments of the present disclosure. The described embodiments are merely a part rather than all of the embodiments of the present disclosure. All other examples obtained by a person of ordinary skill in the art based on the embodiments of the present disclosure without creative efforts shall fall within the protection scope of the present disclosure.

An objective of the present disclosure is to provide an FPGA-based multi-channel DLS autocorrelation system and method to simultaneously collect and calculate sample particle sizes and distribution thereof at a plurality of angles.

FPGA: Field Programmable Gate Array, field programmable gate array.

Autocorrelation: Autocorrelation is also referred to as sequence correlation, and is cross-correlation of a signal at different time points.

To make the foregoing objective, features, and advantages of the present disclosure clearer and more comprehensible, the present disclosure will be further described in detail below with reference to the accompanying drawings and specific implementations.

Figure 1:
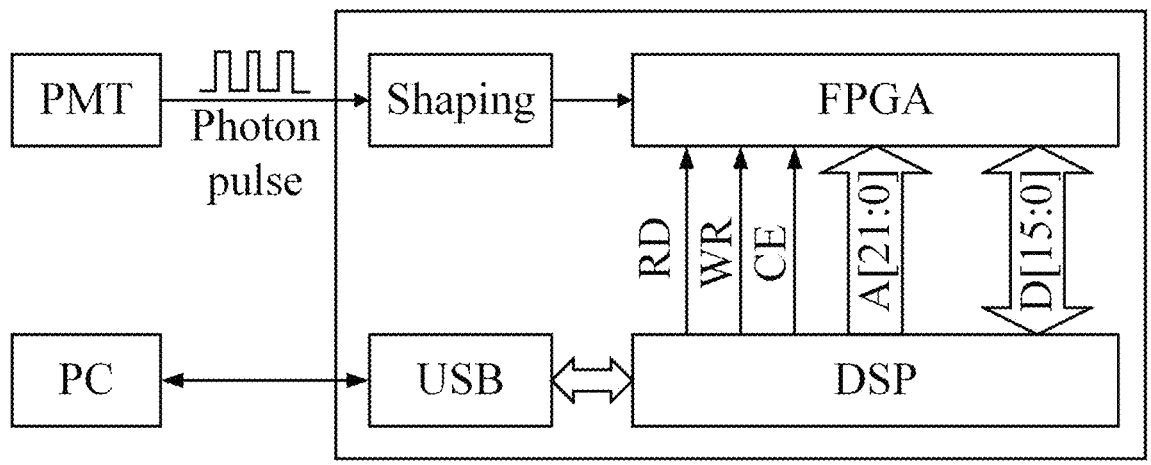
FIG. 1 is a schematic diagram of a proportional photon correlator based on an FPGA and DSP according to the prior art.
Figure 2:
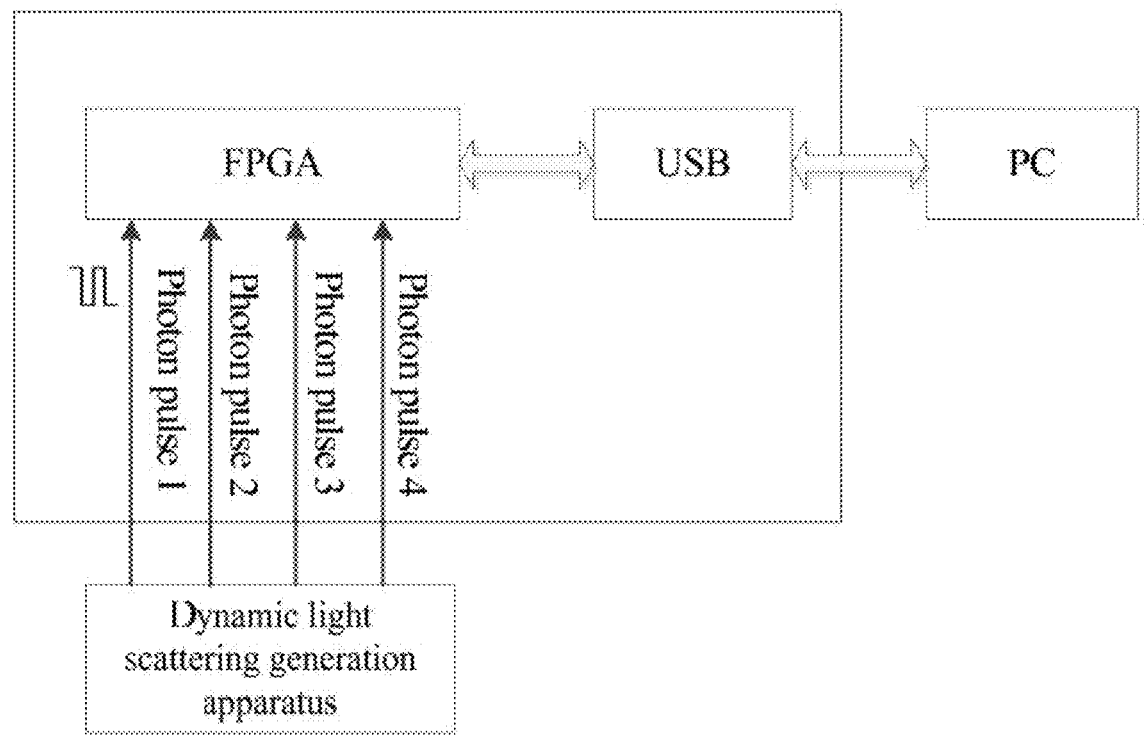
FIG. 2 is a schematic diagram of an FPGA-based multi-channel DLS autocorrelation system according to the present disclosure.
Figure 3:
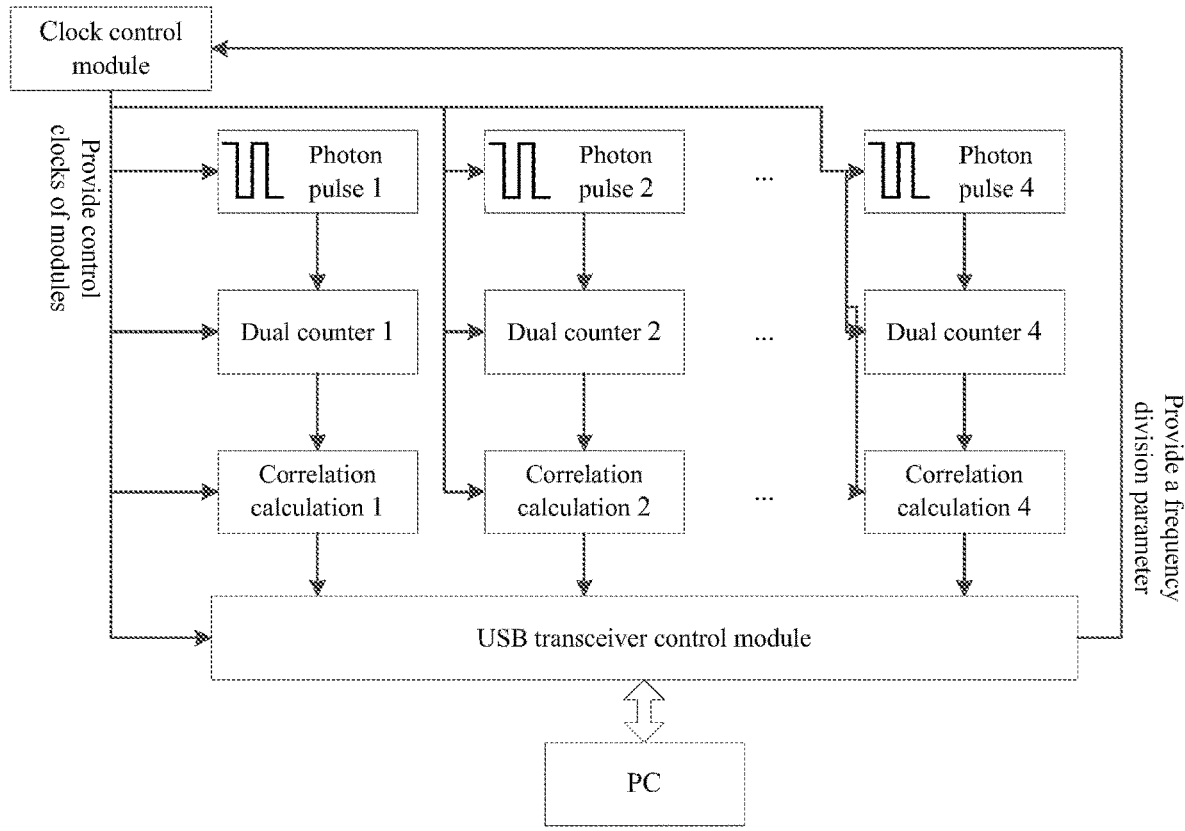
FIG. 3 is a specific schematic structural diagram of an FPGA according to the present disclosure.

As shown in FIG. 2 and FIG. 3, an FPGA-based multi-channel DLS autocorrelation system provided in the present disclosure includes a DLS generation apparatus, a photon correlator, and a host computer.

The photon correlator includes an FPGA and a USB communication module; the DLS generation apparatus is connected to the FPGA; the FPGA is configured to count and perform correlation calculation on photon pulses generated by the DLS generation apparatus; the USB communication module is connected to the host computer; the USB communication module is configured to transmit a counting result and a correlation calculation result to the host computer; the host computer is configured to determine particle information based on the counting result and the correlation calculation result; and the particle information includes a particle size and particle dispersibility.

Figure 4:
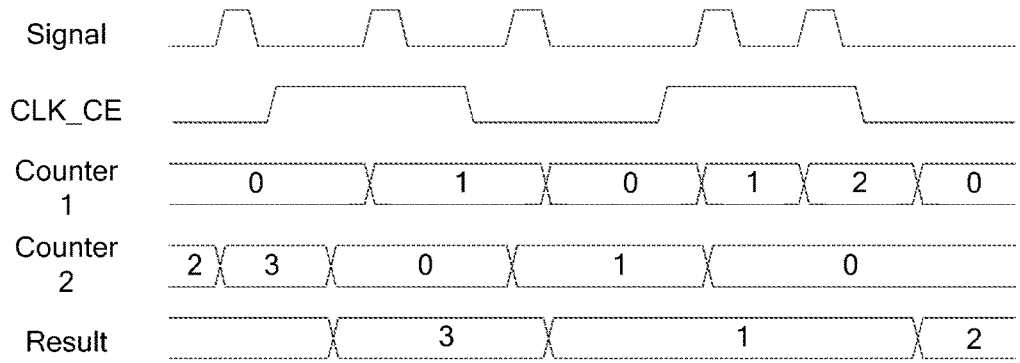
FIG. 4 is a timing diagram of a dual counter.

The FPGA includes a dual counter module and a correlation calculation module; the dual counter module is connected to the DLS generation apparatus and the correlation calculation module; the correlation calculation module is connected to the USB communication module; and the dual counter module includes a plurality of dual counters. FIG. 4 is a timing diagram of the dual counter. The correlation calculation module includes a plurality of correlators.

Figure 5:
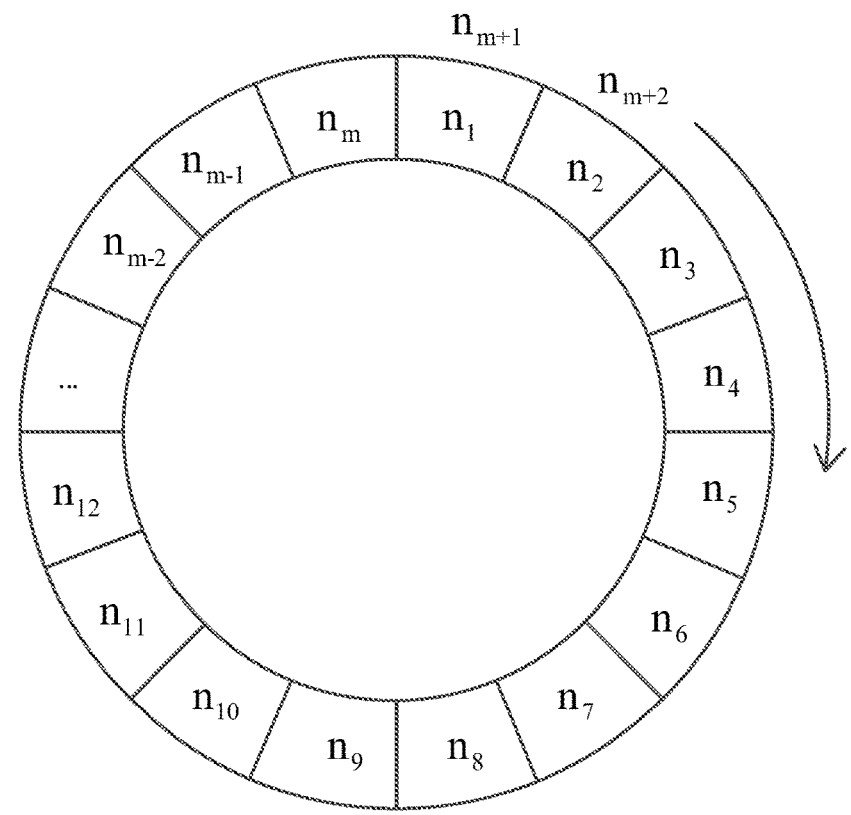
FIG. 5 is a schematic diagram of a dynamic storage area.

During practical applications, the FPGA further includes a dynamic storage area; and the dynamic storage area is configured to store the counting result. FIG. 5 shows a structure of the dynamic storage area.

During practical applications, the FPGA further includes a clock control module, and the clock control module is connected to the DLS generation apparatus, the dual counter module, the correlation calculation module, and the USB communication module.

Figure 6:
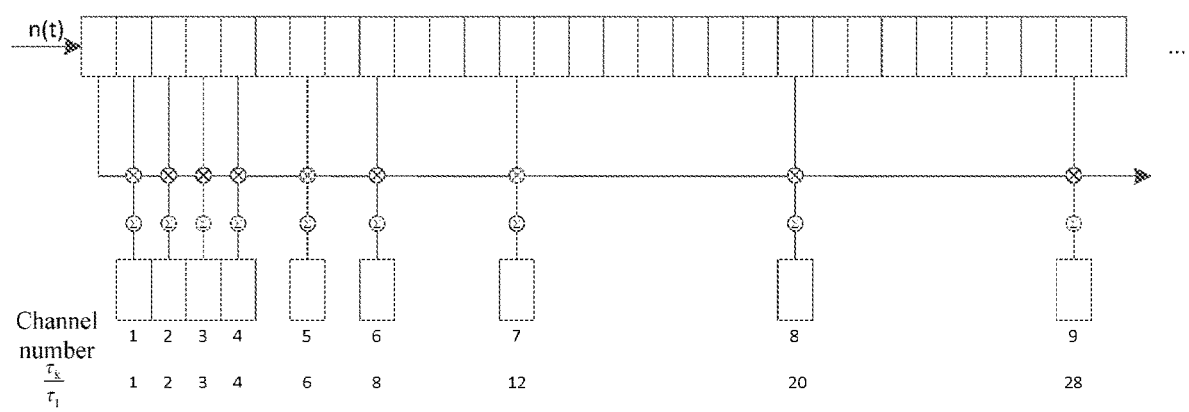
FIG. 6 is a schematic diagram of a proportional correlator.

During practical applications, the correlator is a proportional correlator. FIG. 6 shows a structure of the proportional correlator.

Figure 7:
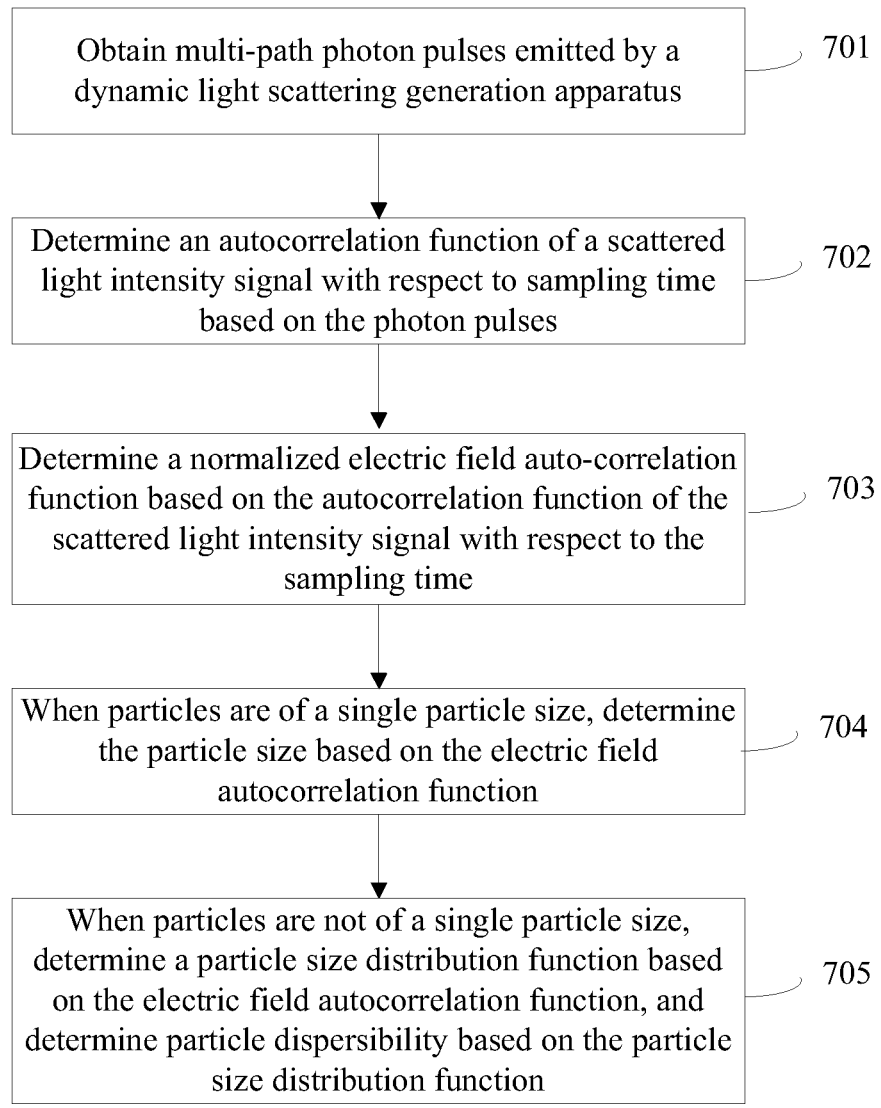
FIG. 7 is a flowchart of an FPGA-based multi-channel DLS autocorrelation method according to the present disclosure.

FIG. 7 shows an FPGA-based multi-channel DLS autocorrelation method according to the present disclosure, where the FPGA-based multi-channel DLS autocorrelation method is applied to the foregoing FPGA-based multi-channel DLS autocorrelation system, and the FPGA-based multi-channel DLS autocorrelation method includes:

Step 701: Obtain multi-path photon pulses emitted by a DLS generation apparatus.

Step 702: Determine an autocorrelation function of a scattered light intensity signal with respect to sampling time based on the photon pulses, where the photon pulses are counted, and the autocorrelation function is determined based on a counting result and the photon pulses.

Step 703: Determine a normalized electric field autocorrelation function based on the autocorrelation function of the scattered light intensity signal with respect to the sampling time.

Step 704: When particles are of a single particle size, determine the particle size based on the electric field autocorrelation function, where when the particles are of the single particle size, a calculation formula of the particle size is:

$$R_h = \frac{K_B T [4\pi \sin\left(\frac{\theta}{2}\right)]^2}{3\pi \Gamma \eta \lambda^2}$$

where $R_h$ is the particle size to be calculated, $K_B$ is a Boltzmann constant, T is an absolute temperature, $\theta$ is a scattering angle, $\Gamma$ is a decay line width, $\eta$ is viscosity of a dispersion medium, and $\lambda$ is a wavelength of incident light in vacuum.

Step 705: When particles are not of a single particle size, determine a particle size distribution function based on the electric field autocorrelation function, and determine particle dispersibility based on the particle size distribution function.

The determining particle dispersibility based on the particle size distribution function specifically includes:

determining normalized variance of the particle size distribution function based on the particle size distribution function, where a calculation formula of the normalized variance is:

$$\frac{\int (\Gamma - \bar{\Gamma})^2 G(\Gamma) d\Gamma}{\bar{\Gamma}^2} = \sigma^2$$

where $\Gamma$ is a decay line width, $\bar{\Gamma}$ is an average decay line width of the particles, $G(\Gamma)$ is the particle size distribution function, and $\sigma^2$ is the normalized variance; and determining the particle dispersibility based on the normalized variance.

In the present disclosure, an FPGA is used to collect and calculate photon pulses generated by a DLS apparatus and to obtain an autocorrelation function. The autocorrelation function is transmitted to a PC, namely, a host computer. An average sample particle size and distribution are obtained through inverse calculation in the host computer. A technical solution of an FPGA-based photon correlator system is mainly divided into an FPGA-based photon correlator and the host computer used for control and data display on a PC end. The photon correlator collects and performs autocorrelation calculation on the multi-angle photon pulses output by the DLS apparatus and uses a USB communication module for real-time communication and high-speed data transmission with the PC (host computer).

The FPGA will receive four paths of photon pulses from a DLS generation apparatus. The four paths of photon pulses are scattered light signals at different scattering angles. Each path of signal is processed by a dual counter module and a correlation calculation module. Finally, correlation calculation results of the fours paths of signals are transmitted to the PC by a USB transceiver control module. A clock control module divides and multiplies a frequency of a system clock to provide a clock for running of other modules. The USB transceiver control module can also accept instructions from the PC, to modify frequency division and frequency multiplication parameters of the clock control module.

A width of the photon pulse is approximately 20 ns. Each time a pulse is collected, a counter is increased by one. A counting result of the counter is stored into a register area every $\tau_{min}$, to wait for use in correlation calculation. To avoid a counting error caused by not clearing the counting result in time and missing counting caused by a timing error, two counters are designed to cooperate to complete seamless pulse counting. The two counters do not interfere with each other during operation and can be cleared in time to re-count after each sampling period is over. As shown in FIG. 4, Signal is a photon pulse, CLK_CE is a counter selection signal, Counter 1 and Counter 2 are two counters, and Result represents a count value stored by the counters. When CLK_CE is in a high electrical level, Counter 1 is in a counting state. If a rising edge of a photon pulse is captured, Counter 1 is increased by 1, and Counter 2 is cleared after a counting result is stored. When CLK_CE is in a low electrical level, Counter 2 is in a counting state. If a rising edge of a photon pulse is captured, Counter 2 is increased by 1, and Counter 1 is cleared after a counting result is stored.

To meet the autocorrelation calculation, each path of photon pulse may produce a large quantity of counting results. It is unrealistic to store all results in the register. Therefore, a dynamic storage area is designed. As shown in FIG. 5, there should be two addresses in a program. One is a write address addr_write responsible for writing a counting result to the dynamic storage area, and the other is a read address addr_read responsible for reading data used for the autocorrelation calculation from the dynamic storage area. If there are a total of m registers in the dynamic storage area, the first counting result $n_1$ is stored into the dynamic storage area, and the write address addr_write is 1, indicating that an address at which the data $n_1$ is stored is 1; the second counting result $n_2$ is stored into the dynamic storage area, and the write address addr_write is 2, indicating that an address at which the data $n_2$ is stored is 2; and so on. When an $(m+1)^{th}$ counting result is stored into the dynamic storage area, the write address addr_write is 1, indicating that an address at which the data $n_{m+1}$ is stored is 1, to overwrite the first count value of completed correlation calculation. A frequency of instructions for correlation calculation is the same as a sampling frequency. That is, after sampling is over each time, correlation calculation is performed once. When a correlator starts the correlation calculation, the read address addr_read is 1, data with a dynamic storage area address addr_write−1 is read, then the first correlation channel is calculated, and addr_read is increased by 1 after the calculation is completed; and so on. Data with a dynamic storage area address addr_write-addr_read is read, and then an (addr_read)$^{th}$ correlation channel is calculated until all correlation channels are calculated and addr_read=1. Instructions for starting correlation calculation next time are waited.

A formula of the correlation calculation is as shown in formula (4-1):

$$G(k\tau) = \frac{1}{N}\sum_{i=0}^{N-k} n_i n_{i+k} (k=1, 2, 3\ldots M) \qquad (4\text{-}1)$$

where $G(k\tau)$ represents an autocorrelation function of scattered light intensity, $\tau$ represents sampling time, $n_i$ represents a quantity of photon pulses obtained in $i^{th}$ sampling, $n_{i+k}$ represents a quantity of photon pulses obtained in $(i+k)^{th}$ sampling, N is a total quantity of sampling times, and M is a quantity of correlation channels. An autocorrelation function (discrete) of a scattered light intensity signal of a test sample with respect to sampling time $\tau$ may be calculated according to the formula. Each delay $k\tau$ corresponds to an autocorrelation function value. M correlation channels have M autocorrelation function values to form the discrete function curve.

The correlation calculation uses a proportional correlator method. As shown in FIG. 6, after sampling is completed each time, a counting result n(t) is stored into the first stage of a shift register, and original data of the first stage is moved to the second stage; and so on. Data in the shift register is shifted to the right in sequence. Then, the first correlation channel performs accumulation calculation after multiplying the first stage and the second stage of the shift register. Delay time of the channel is $\tau$. By analogy, the fifth correlation channel performs accumulation calculation after multiplying the first stage and the seventh stage of the shift register. Delay time of the channel is $6\tau$. The sixth correlation channel performs accumulation calculation after multiplying the first stage and the ninth stage of the shift register. Delay time of the channel is $8\tau$. It can be learned that delay time of a proportional correlation structure channel is not distributed at intervals, although there are corresponding delay units every other sampling period within a correlator dynamic range. In other words, a considerable part of delay units are not allocated with channels for delay time, and these units only play a role in forming a complete delay chain. With this structure, the channel delay time is distributed exponentially, as shown in formula (4-2).

$$\tau_k = \left(\sum_{i=1}^{k} 2^{int(|i-3|/2)} - 1\right) T_s \qquad (4\text{-}2)$$

where $\tau_k$ is delay time of a $k^{th}$ channel $^{int(|i-3|/2)}$ means that an absolute value of (i−3) is divided by 2 and rounded up (no actual physical meaning), and $T_s$ is a unique sampling period, namely, $\tau_{min}$. It can be learned from FIG. 6 that channel resource allocation is denser when delay time is shorter, and as delay time increases, the allocation gradually becomes sparse. Compared with a linear correlator, a proportional correlator effectively increases the correlator dynamic range with relatively fixed channel resources, and relatively ensures resolution of a decay part of a curve.

A correlation function value is transmitted to the PC through the USB module, and an autocorrelation function $g_2(\tau)$ can be fitted based on the correlation function value and corresponding delay. A counting result is used in calculation of $g_1(\tau)$, and a normalized electric field autocorrelation function $g_1(\tau)$ may be obtained based on light intensity proportional to a square of an electric field, as shown in formula 4-3.

$$g_1(\tau) = (g_2(\tau) - 1)^{0.5} \qquad (4\text{-}3)$$

The obtained autocorrelation function $g_1(\tau)$ is an exponential decay function increasing with $\tau$. When particles are of a single particle size, $$g_1(\tau) = e^{-\Gamma\tau} \qquad (4\text{-}4)$$

where $$\Gamma = Dq^2 \qquad (4\text{-}5)$$

$$q = 4\pi n / \left(\lambda \sin\frac{\theta}{2}\right) \qquad (4\text{-}6)$$

$$D = \frac{K_B T}{6\pi\eta R_h} (47) \qquad (4\text{-}7)$$

where $\Gamma$ is a decay line width, D is a translational diffusion coefficient of a particle, q is an optical constant, $\theta$ is a scattering angle, n is a refractive index of a dispersion medium, $\lambda$ is a wavelength of incident light in vacuum, $K_B$ is a Boltzmann constant, T is an absolute temperature, $\eta$ is viscosity of a dispersion medium, and $R_h$ is a particle size to be calculated. A calculation formula for calculating the particle size to be calculated may be derived from the foregoing formula, as shown in formula 4-8.

$$R_h = \frac{K_B T \left[4\pi\sin\left(\frac{\theta}{2}\right)^2\right]}{3\pi\Gamma\eta\lambda^2} \qquad (4\text{-}8)$$

Usually, particles in a solution are not of a single size, and a particle size distribution function $G(\Gamma)$ is introduced.

$$g_1(\tau) = \int G(\Gamma) \cdot e^{-\Gamma\tau} d\Gamma \qquad (4\text{-}9)$$

The formula 4-9 is a Laplace transform equation of the function $G(\Gamma)$ with the decay line width $\Gamma$ as an independent variable. $G(\Gamma)$ represents the particle size distribution function.

$$g_1(\tau) = e^{-\bar{\Gamma}\tau} \int e^{-(\Gamma-\bar{\Gamma})\tau} \cdot G(\Gamma) d\Gamma \qquad (4\text{-}10)$$

where $\bar{\Gamma}$ represents an average decay line width of the particles. When distribution of the particles is relatively narrow, $e^{-\Gamma\tau}$ may perform Taylor expansion near the average decay line width $\bar{\Gamma}$ of the particles. Then the formula 4-10 may be further changed to $$g_1(\tau) = \qquad (4\text{-}11)$$
$$e^{-\bar{\Gamma}\tau} \int \left(1 - (\Gamma-\bar{\Gamma})\tau + \frac{(\Gamma-\bar{\Gamma})^2\tau^2}{2!} - \frac{(\Gamma-\bar{\Gamma})^3\tau^3}{3!} + \ldots\right) G(\Gamma) d\Gamma.$$

Set $$\mu_n = \int (\Gamma-\bar{\Gamma})^n G(\Gamma) d\Gamma$$

Normalized variance of G(Γ) is obtained, as shown in formula 4-12, and is usually used to evaluate particle dispersibility.

$$\frac{\mu_2}{\Gamma^2} = \sigma^2 \qquad (4\text{-}12)$$

where $\mu_n$ is a specified intermediate variable, and $\mu_2$ is a situation when n=2.

At present, collection and calculation capabilities of the FPGA may implement functions of counting and autocorrelation calculation in one chip without a need to use two devices. That is, the functions of counting and autocorrelation calculation are integrated into one chip. The FPGA has an excellent parallel processing capability and can process multi-angle simultaneous collection and calculation. Counting and autocorrelation calculation in the present disclosure are both completed on the FPGA without an aid of additional DSP or an algorithm on a computer. An FPGA chip is used to implement the simultaneous collection and calculation of multi-channel and multi-scattering angle signals. A degree of integration is high. In terms of processing of one path of signal, collection, counting, and autocorrelation calculation are completed in a same chip, and a plurality of paths of signals can be processed on one chip simultaneously. This reduces time of measuring a particle size by using a multi-angle DLS method, and also reduces a test experiment error caused by an external factor such as an environment as time changes.

Each embodiment of the present specification is described in a progressive manner, each embodiment focuses on the difference from other embodiments, and the same and similar parts between the embodiments may refer to each other.

In this specification, several examples are used for illustration of the principles and implementations of the present disclosure. The description of the foregoing embodiments is merely used to help understand the method of the present disclosure and the core ideas thereof. In addition, those of ordinary skill in the art can make various modifications in terms of specific implementations and scope of application in accordance with the ideas of the present disclosure. In conclusion, the content of this specification shall not be construed as a limitation to the present disclosure.

What is claimed is:

1. An FPGA-based multi-channel DLS autocorrelation method, wherein the FPGA-based multi-channel DLS autocorrelation method is applied to an FPGA-based multi-channel DLS autocorrelation system, which comprises a DLS generation apparatus, a photon correlator, and a host computer, wherein the photon correlator comprises an FPGA and a universal serial bus (USB) communication module; the DLS generation apparatus is connected to the FPGA; the FPGA is configured to count and perform correlation calculation on photon pulses generated by the DLS generation apparatus; the USB communication module is connected to the host computer; the USB communication module is configured to transmit a counting result and a correlation calculation result to the host computer; the host computer is configured to determine particle information based on the counting result and the correlation calculation result; and the particle information comprises a particle size and particle dispersibility; and the FPGA comprises a dual counter module and a correlation calculation module; the dual counter module is connected to the DLS generation apparatus and the correlation calculation module; the correlation calculation module is connected to the USB communication module; the dual counter module comprises a plurality of dual counters; and the correlation calculation module comprises a plurality of correlators; and the FPGA-based multi-channel DLS autocorrelation method comprises:
obtaining multi-path photon pulses emitted by the DLS generation apparatus;
determining an autocorrelation function of a scattered light intensity signal with respect to sampling time based on the photon pulses;
determining a normalized electric field autocorrelation function based on the autocorrelation function of the scattered light intensity signal with respect to the sampling time; and
when particles are of a single particle size, determining the particle size based on the electric field autocorrelation function; or
when particles are not of a single particle size, determining a particle size distribution function based on the electric field autocorrelation function; and
determining particle dispersibility based on the particle size distribution function.

2. The FPGA-based multi-channel DLS autocorrelation method according to claim 1, wherein the FPGA further comprises a dynamic storage area; and the dynamic storage area is configured to store the counting result.

3. The FPGA-based multi-channel DLS autocorrelation method according to claim 2, wherein when the particles are of the single particle size, a calculation formula of the particle size is:

$$R_h = \frac{K_B T \left[ 4\pi \sin\left(\frac{\theta}{2}\right) \right]^2}{3\pi \Gamma \eta \lambda^2}$$

wherein $R_h$ the particle size to be calculated, $K_B$ is a Boltzmann constant, T is an absolute temperature, θ is a scattering angle, Γ is a decay line width, η is viscosity of a dispersion medium, and λ is a wavelength of incident light in vacuum.

4. The FPGA-based multi-channel DLS autocorrelation method according to claim 2, wherein the determining particle dispersibility based on the particle size distribution function specifically comprises:
determining normalized variance of the particle size distribution function based on the particle size distribution function; and
determining the particle dispersibility based on the normalized variance.

5. The FPGA-based multi-channel DLS autocorrelation method according to claim 4, wherein a calculation formula of the normalized variance is:

$$\frac{\int (\Gamma - \overline{\Gamma})^2 G(\Gamma) d\Gamma}{\overline{\Gamma}^2} = \sigma^2$$

wherein Γ is a decay line width, $\bar{Γ}$ is an average decay line width of the particles, G(Γ) is the particle size distribution function, and $σ^2$ is the normalized variance.

6. The FPGA-based multi-channel DLS autocorrelation method according to claim 1, wherein the FPGA further comprises a clock control module, and the clock control module is connected to the DLS generation apparatus, the dual counter module, the correlation calculation module, and the USB communication module.

7. The FPGA-based multi-channel DLS autocorrelation method according to claim 6, wherein when the particles are of the single particle size, a calculation formula of the particle size is:

$$R_h = \frac{K_B T \left[ 4\pi \sin\left(\frac{\theta}{2}\right)^2 \right]}{3\pi Γ η λ^2}$$

wherein $R_h$ the particle size to be calculated, $K_B$ is a Boltzmann constant, T is an absolute temperature, θ is a scattering angle, Γ is a decay line width, η is viscosity of a dispersion medium, and λ is a wavelength of incident light in vacuum.

8. The FPGA-based multi-channel DLS autocorrelation method according to claim 6, wherein the determining particle dispersibility based on the particle size distribution function specifically comprises:
determining normalized variance of the particle size distribution function based on the particle size distribution function; and
determining the particle dispersibility based on the normalized variance.

9. The FPGA-based multi-channel DLS autocorrelation method according to claim 8, wherein a calculation formula of the normalized variance is:

$$\frac{\int (Γ - \bar{Γ})^2 G(Γ) dΓ}{\bar{Γ}^2} = σ^2$$

wherein Γ is a decay line width, $\bar{Γ}$ is an average decay line width of the particles, G(Γ) is the particle size distribution function, and $σ^2$ is the normalized variance.

10. The FPGA-based multi-channel DLS autocorrelation method according to claim 1, wherein the correlator is a proportional correlator.

11. The FPGA-based multi-channel DLS autocorrelation method according to claim 10, wherein when the particles are of the single particle size, a calculation formula of the particle size is:

$$R_h = \frac{K_B T \left[ 4\pi \sin\left(\frac{\theta}{2}\right)^2 \right]}{3\pi Γ η λ^2}$$

wherein $R_h$ is the particle size to be calculated, $K_B$ is a Boltzmann constant, T is an absolute temperature, θ is a scattering angle, Γ is a decay line width, η is viscosity of a dispersion medium, and λ is a wavelength of incident light in vacuum.

12. The FPGA-based multi-channel DLS autocorrelation method according to claim 10, wherein the determining particle dispersibility based on the particle size distribution function specifically comprises:
determining normalized variance of the particle size distribution function based on the particle size distribution function; and
determining the particle dispersibility based on the normalized variance.

13. The FPGA-based multi-channel DLS autocorrelation method according to claim 12, wherein a calculation formula of the normalized variance is:

$$\frac{\int (Γ - \bar{Γ})^2 G(Γ) dΓ}{\bar{Γ}^2} = σ^2$$

wherein Γ is a decay line width, $\bar{Γ}$ is an average decay line width of the particles, G(Γ) is the particle size distribution function, and $σ^2$ is the normalized variance.

14. The FPGA-based multi-channel DLS autocorrelation method according to claim 1, wherein when the particles are of the single particle size, a calculation formula of the particle size is:

$$R_h = \frac{K_B T \left[ 4\pi \sin\left(\frac{\theta}{2}\right)^2 \right]}{3\pi Γ η λ^2}$$

wherein $R_h$ the particle size to be calculated, $K_B$ is a Boltzmann constant, T is an absolute temperature, θ is a scattering angle, Γ is a decay line width, η is viscosity of a dispersion medium, and λ is a wavelength of incident light in vacuum.

15. The FPGA-based multi-channel DLS autocorrelation method according to claim 1, wherein the determining particle dispersibility based on the particle size distribution function specifically comprises:
determining normalized variance of the particle size distribution function based on the particle size distribution function; and
determining the particle dispersibility based on the normalized variance.

16. The FPGA-based multi-channel DLS autocorrelation method according to claim 15, wherein a calculation formula of the normalized variance is:

$$\frac{\int (Γ - \bar{Γ})^2 G(Γ) dΓ}{\bar{Γ}^2} = σ^2$$

wherein Γ is a decay line width, $\bar{Γ}$ is an average decay line width of the particles, G(Γ) is the particle size distribution function, and $σ^2$ is the normalized variance.

* * * * *